US010247820B2

(12) United States Patent
Tabrikian et al.

(10) Patent No.: US 10,247,820 B2
(45) Date of Patent: Apr. 2, 2019

(54) SPATIAL COGNITIVE RADAR

(71) Applicant: GM Global Technology Operations LLC, Detroit, MI (US)

(72) Inventors: Joseph Tabrikian, Tel Aviv (IL); Oded Bialer, Petah Tikva (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 520 days.

(21) Appl. No.: 14/986,834

(22) Filed: Jan. 4, 2016

(65) Prior Publication Data

US 2016/0195614 A1 Jul. 7, 2016

Related U.S. Application Data

(60) Provisional application No. 62/100,565, filed on Jan. 7, 2015.

(51) Int. Cl.
*G01S 13/93* (2006.01)
*G01S 13/02* (2006.01)
*H01Q 1/32* (2006.01)
*H01Q 3/26* (2006.01)

(52) U.S. Cl.
CPC ......... *G01S 13/931* (2013.01); *H01Q 1/3233* (2013.01); *H01Q 3/26* (2013.01); *G01S 2013/0245* (2013.01); *G01S 2013/0254* (2013.01); *G01S 2013/9375* (2013.01)

(58) Field of Classification Search
CPC ............... G01S 13/931; G01S 13/87; G01S 2007/2883; G01S 2013/9375; G01S 1/02; G01S 2013/0245; G01S 2013/0254; G01S 2013/9332; G01S 3/023; H04B 7/0617;
(Continued)

(56) References Cited

U.S. PATENT DOCUMENTS 5,905,473 A * 5/1999 Taenzer ............... H01Q 3/2605
343/834
7,429,947 B2 9/2008 Shima
8,036,711 B2 10/2011 Catreux-Erceg et al.
(Continued)

FOREIGN PATENT DOCUMENTS

CN 102223186 A 10/2011
CN 102457315 A 5/2012
JP 2008167479 A 7/2008

OTHER PUBLICATIONS

Chinese Office Action for CN Application No. 201610087980.2, dated Oct. 17, 2017, pp. 1-10.
(Continued)

*Primary Examiner* — Olumide Ajibade Akonai
(74) *Attorney, Agent, or Firm* — Cantor Colburn LLP

(57) ABSTRACT

A spatial cognitive radar system, method of assembling the radar, and method of selecting antenna elements in the radar are described. The system includes a phased array of a plurality of antenna elements and a plurality of receiver channels, the plurality of receiver channels being a value greater than one and less than a number of the plurality of antenna elements. The system also includes a processor to determine a subset of the plurality of antenna elements, equal in number to the plurality of receiver channels, to be used in transmitting or receiving with the spatial cognitive radar system.

18 Claims, 3 Drawing Sheets

(58) Field of Classification Search
CPC ........ H04B 7/0842; H01Q 3/24; H01Q 25/00; H01Q 3/26
See application file for complete search history.

(56) References Cited

U.S. PATENT DOCUMENTS

| | | | |
|---|---|---|---|
| 8,988,278 B2* | 3/2015 | Lee ........................ | G01S 3/74 342/372 |
| 9,274,222 B1* | 3/2016 | Schmalenberg ........ | G01S 7/282 |
| 9,295,006 B2 | 3/2016 | Jalali et al. | |
| 10,033,098 B2* | 7/2018 | Schoor .................... | H01Q 3/24 |
| 2008/0119150 A1 | 5/2008 | Su | |
| 2011/0084871 A1* | 4/2011 | Haykin ................... | G01S 7/282 342/82 |
| 2011/0086671 A1 | 4/2011 | Catreux-Erceg et al. | |
| 2011/0163906 A1* | 7/2011 | Yang ....................... | G01S 7/03 342/27 |
| 2012/0056780 A1* | 3/2012 | Antonik .................. | G01S 7/282 342/25 B |
| 2015/0201420 A1* | 7/2015 | Martone ............... | H04W 4/025 370/252 |
| 2015/0331086 A1* | 11/2015 | Hassen .................... | G01S 7/02 342/175 |

OTHER PUBLICATIONS

Wenhua et al., "A New Type of Radar—MIMO Radar", Fire Control Radar Technology, vol. 37, No. 1, Mar. 2008, pp. 1-4.

Yong et al., Development and Application of MIMO Radar, Fire Control Radar Technology, vol. 39, No. 1, Mar. 2010, pp. 1-10.

Zi-Shu et al., "MIMO Radar and Its Technical Characteristic Analyses", ACTA Electronic Sinica, vol. 33, No. 12A, Dec. 2005, pp. 1-5.

Chinese Office Action for CN Application No. 201610087980.2, dated Jun. 21, 2018, pp. 1-13.

* cited by examiner

SPATIAL COGNITIVE RADAR

CROSS-REFERENCE TO RELATED APPLICATION

This application is a Non-Provisional of U.S. Provisional Patent Application Ser. No. 62/100,565 filed Jan. 7, 2015, the disclosure of which is incorporated by reference herein in its entirety.

FIELD OF THE INVENTION

The subject invention relates to spatial cognitive radar.

BACKGROUND

Radio detection and ranging (radar) systems use radio waves to determine range, direction, and speed of objects. In various applications, radar systems are integrated with other detection systems. For example, automotive safety features are becoming increasingly sophisticated and automated, and these features operate based on detection of objects and obstructions rather than relying solely on driver detection and intervention. The integration of radar systems with automotive safety features facilitates the detection of objects and obstructions for use by the safety features.

SUMMARY OF THE INVENTION

According to an embodiment, a spatial cognitive radar system includes a phased array of a plurality of antenna elements; a plurality of receiver channels, the plurality of receiver channels being of a number greater than one and less than a number of the plurality of antenna elements; and a processor configured to determine a subset of the plurality of antenna elements, equal in number to the plurality of receiver channels, to be used in transmitting or receiving with the spatial cognitive radar.

According to another embodiment, a method of assembling a spatial cognitive radar includes obtaining a phased array of a plurality of antenna elements; obtaining a plurality of receiver channels, the plurality of receiver channels being of a number greater than one and less than a number of the plurality of antenna elements; and disposing selectors between the plurality of antenna elements and the plurality of receiver channels, the selectors configured to couple each of the plurality of receiver channels to a respective subset of the plurality of antenna elements.

According to yet another embodiment, a method selecting antenna elements in a spatial cognitive radar that includes a plurality of the antenna elements and a plurality of receiver channels, a number of the plurality of antenna elements being greater than a number of the plurality of receiver channels, includes controlling, based on a processor, selectors configured to couple the plurality of receiver channels to a subset of the plurality of antenna elements to an initial position corresponding to an initial subset of the plurality of antenna elements; processing, at the processor, signals received at the plurality of receiver channels; and changing one or more of the antenna elements in the initial subset of the plurality of antenna elements based on the signals.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
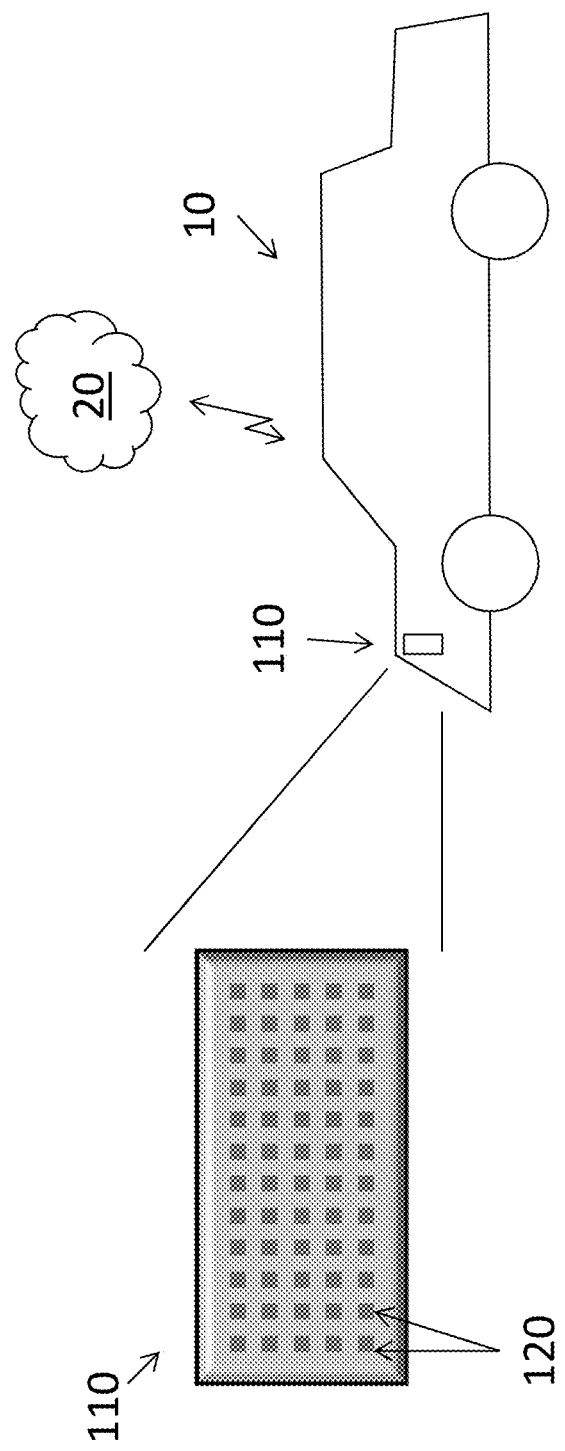
FIG. 1 illustrates an exemplary device that includes a radar system according to an embodiment of the invention.

The following description is merely exemplary in nature and is not intended to limit the present disclosure, its application or uses. It should be understood that throughout the drawings, corresponding reference numerals indicate like or corresponding parts and features.

As noted above, radar systems may be integrated with other detection systems. For example, radar systems may be used to detect and track objects or obstructions in automotive safety systems. Generally, a radar system may have separate receiving and transmitting channels or be a transceiver that both transmits and receives signals via separate antennas or the same antenna. In a safety application, a radar system that transmits signals independently of the received echoes is possible but the discussion herein assumes that the receive channel and transmit channel are connected in the feedback loop and the transmitted signal depends on the received radar echoes. The advanced safety features in automobiles, for example, benefit from high angular resolution in the received radar image because the direction of an object relative to the automobile is of great relevance. Angular resolution in a radar system is a function of aperture or physical antenna size (area receiving the frequency energy). Conventionally, phased array or digital beam forming approaches are used for direction of arrival estimation. An array of sensors is used such that the relative phases of the sensors provide the desired direction of arrival information. An array of sensors spaced closer than a half wavelength apart can provide the effective or overall aperture but can require a large number of antenna elements with their corresponding cost and weight. This is because, in prior radar systems, each antenna element has a corresponding transmit and/or receive channel, and each channel includes a set of hardware elements (e.g., a mixer, analog-to-digital (for the receive channel) and digital-to-analog (for the transmit channel) converter). This one-to-one correspondence between each antenna element and hardware associated with a channel represents an increasing cost of an increasing aperture size (increasing angular resolution). The number of antenna elements (and corresponding channels) (N) required for a desired angular discrimination may depend on angular resolution ($\Delta\Omega$) and spacing ($\alpha$) between the elements of the array and may be given by:

$$N = \frac{1}{\alpha^2 \Delta\Omega} \quad \text{[EQ. 1]}$$

Thus, for example, for a 2 degree by 2 degree resolution, 2000 antenna elements and corresponding receive channels are required (N=2000 in EQ. 1).

A previous attempt at addressing the cost of having a channel associated with each antenna element has involved using a single channel or fewer channels than antenna elements (and associated hardware) and switching between the numerous antenna elements of the array over time. This approach, while reducing the number of transmit and receive channels to one (or a smaller number of channels) and thereby reducing their associated cost, may be too slow for many applications because of the time it takes to switch between all antenna elements and thereby obtain the desired angular resolution. Embodiments of the systems and methods described herein relate to using fewer channels than antenna elements and using a tuning process referred to as a cognitive selection process to select a subset of antenna elements dynamically and adaptively according to the previously received radar echoes. According to the current approach, the field of view (Ωfov) is considered, and the theoretical minimum number of receive channels may be determined as a function of the field of view:

$$N_{min} = \frac{\Omega_{fov}}{\Delta\Omega} \quad [\text{EQ. 2}]$$

For example, for a 60 degree by 10 degree field of view, for example, the same resolution (2 degrees by 2 degrees) discussed above requires only 150 receive channels according to EQ. 2 (in contrast to the 2000 channels noted above). The embodiments detailed below relate to using this minimum number of channels and selecting which antenna elements should be associated with those channels (should be active) based on a cognitive selection process. While automotive uses (integration of the radar system with safety systems of an automobile) are particularly discussed for exemplary purposes, the radar system described herein and, specifically, the antenna element selection or tuning are not limited in any way to one particular application. Not only other vehicle platforms—construction vehicles, water-borne vehicles, and the like—but land-based or stationary applications are also contemplated.

FIG. 1 illustrates an exemplary device 10 that includes a radar system 110 according to an embodiment of the invention. The device 10 may include any number of sensors and safety systems. The device 10 may also include the capability to communicate via a network 20. As noted above, the radar system 110 is assumed to be a transceiver for explanatory purposes but may be receive-only or have separate antenna elements for transmit and receive functions in alternate embodiments. The exemplary device 10 is an automobile. While the radar system 110 is shown as being disposed in one particular location of the automobile, the radar system 110 is not limited to any particular placement and may instead by located elsewhere within the automobile (device 10). The radar system 110 is shown with a number of antenna elements 120. As noted above, each of the antenna elements 120 would have a corresponding receive channel in a traditional phased array system or one receive channel would be shared among all the antenna elements 120. As further detailed below, the radar system 110 according to embodiments of the invention includes more than one receive (and transmit) channel but fewer channels than antenna elements 120.

Figure 2:
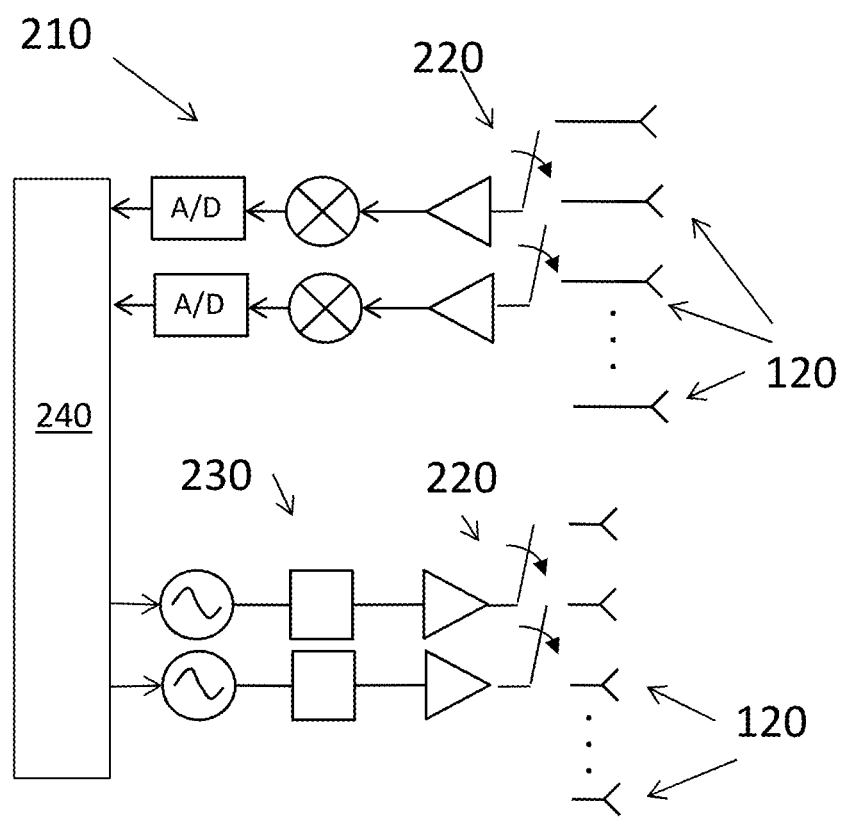
FIG. 2 depicts block diagrams of receiver channels and transmit channels associated with the radar system according to embodiments of the invention.

FIG. 2 depicts block diagrams of receiver channels 210 and transmit channels 230 associated with the radar system 110 according to embodiments of the invention. As FIG. 2 shows, a controller 240 receives the signals from the receiver channels 210 and provides the signals to the transmit channels 230. Selectors 220 (e.g., switches) are used to determine which of the antenna elements 120 are connected to a receiver channel 210 during reception or to a transmit channel 230 during transmission. Unselected antenna elements 120 are not used. A radar system 110 with N antenna elements 120 will have Mrx receiver channels 210 and Mtx transmit channels 230 such that Mrx and Mtx are greater than 1 but also less than N. The process by which the selectors 220 are controlled by the controller 240 is further discussed below. The controller 240 includes one or more processors and one or more memory devices. The processor or processing circuitry may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 3:
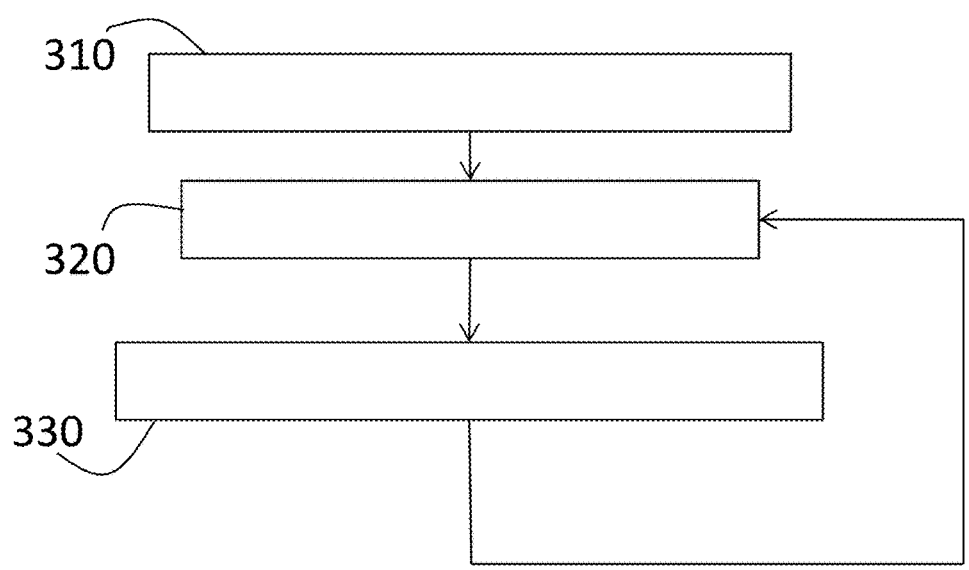
FIG. 3 is a process flow of a method of selecting antenna elements according to embodiments of the invention.

FIG. 3 is a process flow of a method of selecting antenna elements 120 according to embodiments of the invention. Selecting initial antenna elements 120, at block 310, may include selecting a default set of antenna elements 120, a random set of antenna elements 120, or a set of antenna elements 120 based on apriori knowledge of the object or obstruction being detected. The apriori knowledge may be provided by another sensor in the device 10, for example or be extracted from previous radar echoes, or through the network 20 to which the device 10 is coupled. At block 320, receiving and processing signals includes using the receiver channels 210 and controller 240. Refining the choice of antenna elements 120, at block 330, for both receive and transmit purposes involves the receiving and processing at block 320. That is, the signal strength and other characteristics of received signals provide information to cognitively adjust the selection of antenna elements 120. For example, if one of the receiver channels 210 has higher signal strength than other receiver channels 210, antenna elements 120 nearer (in associated phase) to the antenna element 120 associated with that higher signal strength receiver channel 210 may be selected (again, both for subsequent transmission and reception). In general, selection of the antenna elements 120 according to embodiments described herein includes an iterative process based on optimizing some criterion (e.g., signal strength, probability of detection, probability of resolution, bound on the estimation error). Each of these criteria is a known characteristic and may be the basis for selection of antenna elements 120. Blocks 320 and 330 may be implemented iteratively. That is, each time more signals are received and processed (block 320), the antenna element 120 selection may be further refined (block 330) for both receiving and transmitting.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A spatial cognitive radar system, comprising:
a phased array of a plurality of antenna elements;
a plurality of receiver channels, the plurality of receiver channels being of a number greater than one and less than a number of the plurality of antenna elements, wherein signals received at the plurality of receiver channels of the special cognitive radar are echoes resulting from transmissions by the spatial cognitive radar; and a processor configured to determine a subset of the plurality of antenna elements, equal in number to the plurality of receiver channels, the subset of the plurality of antenna elements to be used in transmitting or receiving with the spatial cognitive radar system, wherein the number of the plurality of receiver channels is based on a desired field of view and desired angular resolution.

2. The system according to claim 1, wherein the processor determines the subset based on processing the signals received in the plurality of receiver channels.

3. The system according to claim 2, wherein the processor determines the subset iteratively based on a criterion.

4. The system according to claim 3, wherein the criterion includes signal strength, probability of detection, probability of resolution, or bound on an estimation error of the signals received in the plurality of receiver channels.

5. The system according to claim 2, wherein the signals are received using an initial subset of the plurality of antenna elements.

6. The system according to claim 5, wherein the initial subset is determined randomly, by default, or based on prior knowledge.

7. A method of assembling a spatial cognitive radar, the method comprising:

obtaining a phased array of a plurality of antenna elements;

obtaining a plurality of receiver channels, the plurality of receiver channels being of a number greater than one and less than a number of the plurality of antenna elements, wherein signals received at the plurality of receiver channels of the special cognitive radar are echoes resulting from transmissions by the spatial cognitive radar;

disposing selectors between the plurality of antenna elements and the plurality of receiver channels, the selectors configured to couple each of the plurality of receiver channels to a respective subset of the plurality of antenna elements; and determining the number of the plurality of receiver channels based on a desired field of view and a desired angular resolution for the radar.

8. The method according to claim 7, further comprising coupling a processor to the selectors, the processor being configured to determine which of the plurality of antenna elements is part of the subset of the plurality of antenna elements.

9. The method according to claim 8, further comprising instructing the processor to determine the subset of the plurality of antenna elements based on the signals received at the plurality of receiver channels.

10. The method according to claim 9, further comprising the processor determining the subset of the plurality of antenna elements based on signal strength, probability of detection, probability of resolution, or a bound on estimation error of the received signals at the plurality of receiver channels.

11. The method according to claim 7, further comprising disposing the plurality of antenna elements in an automobile.

12. A method of selecting antenna elements in a spatial cognitive radar comprising a plurality of the antenna elements and a plurality of receiver channels, a number of the plurality of antenna elements being greater than a number of the plurality of receiver channels, the method comprising:

controlling, based on a processor, selectors configured to couple the plurality of receiver channels to a subset of the plurality of antenna elements to an initial position corresponding to an initial subset of the plurality of antenna elements;

processing, at the processor, signals received at the plurality of receiver channels, wherein the signals received at the plurality of receiver channels of the special cognitive radar are echoes resulting from transmissions by the spatial cognitive radar;

changing one or more of the antenna elements in the initial subset of the plurality of antenna elements based on the signals; and selecting the number of the plurality of receiver channels based on a desired field of view and a desired angular resolution for the spatial cognitive radar.

13. The method according to claim 12, further comprising selecting the initial subset of the plurality of antenna elements as a default.

14. The method according to claim 12, further comprising selecting the initial subset of the plurality of antenna elements randomly using the processor.

15. The method according to claim 12, further comprising selecting the initial subset of the plurality of antenna elements based on prior-known information provided to the processor.

16. The method according to claim 12, further comprising performing the processing the signals and the changing the one or more of the antenna elements iteratively.

17. The method according to claim 12, wherein the processing the signals received at the plurality of receiver channels includes determining signal strength, probability of detection, probability of resolution, or a bound on estimation error.

18. The method according to claim 12, further comprising controlling the selectors to couple transmit channels numbering the number of the plurality of receiver channels to the subset of the antenna elements based on the processing the signals received at the plurality of receiver channels.

* * * * *